Patented Dec. 29, 1931                                                                  1,838,147

UNITED STATES PATENT OFFICE

HIRAM S. LUKENS AND NICOL H. SMITH, OF PHILADELPHIA, PENNSYLVANIA, ASSIGNORS TO SOLIDON PRODUCTS, INC., OF PHILADELPHIA, PENNSYLVANIA, A CORPORATION OF DELAWARE

PLASTIC MAGNESIA MIXTURE

No Drawing.    Application filed June 18, 1931.  Serial No. 545,368.

In the use of magnesia cements, such as set forth in the copending application of Hiram S. Lukens, Ser. No. 406,560, filed November 12, 1929, the mixture expands after the initial set. Such expansion is of small magnitude (usually about 0.1% to 0.12% after fourteen days), and such expansion is advantageous in compensating for shrinkage of wooden trim and the like when the product is used in the fabrication of walls, ceilings, flooring or stucco. In the case of molding such materials into cast objects, however, this small expansion is objectionable. It causes the casting to adhere tenaciously to the walls and bottom of the molds and often causes fracture thereof; especially as it is desirable to release the molds as promptly as possible for the making of further castings and when so removed, the castings have not sufficient strength to withstand rough or abusive treatment.

We have discovered that if part of the magnesium chloride is replaced or substituted by magnesium sulphate in part, in accordance with the molecular proportions described in the copending application of Hiram S. Lukens, Ser. No. 406,560, such mixture counteracts this objectionable expansion to a degree depending on the amount of chloride which is replaced by sulphate. We have also found that the desired effect is still more pronounced where soaps, preferably soda soaps, are added to the extent of, say, 1½ to 2% of the total mixture. Such soaps or equivalents thereof act to retard the rate of evaporation of water from the mixture and to decrease the voids in the finished product; and where such are used, we intend to cover and include materials which have such action in retarding evaporation.

In copending application Ser. No. 406,560, there is described a mixture of magnesium oxide, magnesium chloride, water and aggregate made in such proportions that the amounts of magnesium oxide and magnesium chloride are within the ratio of one part by weight of magnesium oxide to about .84 to 1.25 parts by weight of $MgCl_2 6H_2O$, and the ratio of the amount of aggregate to the combined amounts of magnesium oxide and magnesium chloride is such that the amount of water required to produce therefrom a mix of the proper consistency for manipulation will not be in excess of that amount which would produce a solution of 16° Bé. if the amount of magnesium chloride in the mixture were dissolved therein. By the use of such proportions, a substantially uniform and stable product is obtained where heretofore such results have been variable and unreliable.

In the following table we give the results where magnesium sulphate replaces part of the magnesium chloride expressed as a percentage of the total amount of magnesium chloride required in accordance with the ratio of said copending application Ser. No. 406,560; the second column giving the expansion percentages of the product at fourteen days after initial setting:

| % of $MgCl_2$ replaced by $MgSO_4$ | % expansion |
|---|---|
| 0.0 | +0.120 |
| 1.0 | + .080 |
| 4.0 | + .060 |
| 6.0 | + .040 |
| 9.0 | + .030 |
| 15.0 | + .020 |
| 20.0 | + .016 |
| 30.0 | + .007 |
| 34.0 | .000 |
| 35.0 | − .002 |
| 40.0 | − .012 |
| 45.0 | − .026 |
| 50.0 | − .040 |

We are aware that magnesium sulphate has been added to Sorel cement mixtures to change any calcium oxide present to harmless calcium sulphate. Calcium oxide or lime present in the calcined magnesite has been known to be objectionable as it may form calcium chloride, and the sulphate addition has been used to overcome this difficulty. However, we are not aware that the sulphate has been added in connection with the proportions of the copending application of Hiram S. Lukens, Ser. No. 406,560, above referred to, nor that any one has heretofore discovered its effect in a reducing expansion in such case.

The amount of chloride which is replaced by sulphate may be varied and other variations may be made without departing from my invention.

We claim:

1. As a new composition of matter, a mixture of magnesium oxide, magnesium chloride, magnesium sulphate and aggregate in such proportions that the amounts of magnesium oxide, magnesium chloride and magnesium sulphate are within the ratio of one part by weight of magnesium oxide to from .84 to 1.3 parts by weight of $MgCl_2 6H_2O$ and magnesium sulphate ($MgSO_4 7H_2O$) and the ratio of the amount of aggregate to the combined amounts of magnesium oxide, magnesium chloride and magnesium sulphate is such that the amount of water required to produce therefrom a mix of proper consistency for manipulation will not be in excess of that amount which would produce a solution of 16° Bé. if the amount of magnesium chloride (and magnesium sulphate) in the mixture were dissolved therein.

2. As a new composition of matter, a mixture of magnesium oxide, magnesium chloride, magnesium sulphate and aggregate in such proportions that the amounts of magnesium oxide, magnesium chloride and magnesium sulphate are within the ratio of one part by weight of magnesium oxide to from .84 to 1.3 parts by weight of $MgCl_2 6H_2O$ and magnesium sulphate ($MgSO_4 7H_2O$) and the ratio of the amount of aggregate to the combined amounts of magnesium oxide, magnesium chloride and magnesium sulphate is such that the amount of water required to produce therefrom a mix of proper consistency for manipulation will not be in excess of that amount which would produce a solution of 16° Bé. if the amount of magnesium chloride (and magnesium sulphate) in the mixture were dissolved therein, said mixture maintaining an added inhibitor for evaporation of water.

3. As a new composition of matter, a mixture of magnesium oxide, magnesium chloride, magnesium sulphate and aggregate in such proportions that the amounts of magnesium oxide, magnesium chloride and magnesium sulphate are within the ratio of one part by weight of magnesium oxide to from .84 to 1.3 parts by weight of $MgCl_2 6H_2O$ and magnesium sulphate ($MgSO_4 7H_2O$) and the ratio of the amount of aggregate to the combined amounts of magnesium oxide, magnesium chloride and magnesium sulphate is such that the amount of water required to produce therefrom a mix of proper consistency for manipulation will not be in excess of that amount which would produce a solution of 16° Bé. if the amount of magnesium chloride (and magnesium sulphate) in the mixture were dissolved therein, said mixture containing a soap adapted to retard the rate of evaporation of water and decrease the voids.

In testimony whereof we have hereunto set our hands.

HIRAM S. LUKENS.
NICOL H. SMITH.